Patented Feb. 23, 1943

2,312,266

UNITED STATES PATENT OFFICE 2,312,266

FLUORESCENT MATERIAL AND PROCESS OF MAKING SAME

Willard A. Roberts, Euclid, Ohio, assignor to General Electric Company, a corporation of New York No Drawing. Application November 20, 1940, Serial No. 366,435

9 Claims. (Cl. 250—81)

The present invention relates to fluorescent materials (phosphors) and especially to those employed in the manufacture of fluorescent lamps. More particularly, it relates to an improved process for producing an improved fluorescent aluminum oxide activated by chromium.

Chromium activated aluminum oxide has proved particularly valuable as a phosphor or fluorescent material in fluorescent lamps of the mercury vapor type—such as is shown in the U. S. Patent No. 2,182,732 to Meyer et al., and in the U. S. Patent No. 2,211,590 to Nicolaas Addink, for example. Its value arises from the fact that it fluoresces in the deep red spectral region when excited by the longer wave length ultra-violet or by deep blue radiation. It thus affords considerable color correction to the predominantly blue light from a mercury discharge both by absorbing the excess blue and by correcting the deficiency in red. Although natural and artificial ruby has this composition, it has hitherto been impossible to form artificial ruby at temperatures less than about 2000° centigrade. I have found, however, that by my process an improved and brighter phosphor of this composition can be formed at temperatures as low as 1000° C.

In one method of carrying out my improved process, I add to a quantity of aluminum oxide from 0.1 to 10 per cent, preferably from 0.5 to 2 per cent, of chromium in the form of a suitable chromium compound and from 2 to 10 per cent, preferably however about 5 per cent, of a flux such as one of the fluorides of aluminum, magnesium and calcium. Suitable chromium compounds are exemplified by the chromates of lead, silver, potassium, cadmium, cerium, uranium and thallium. Those of lead and silver I have found to be particularly workable. In the place of aluminum oxide, aluminum nitrate, aluminum hydroxide, or any other oxygen containing aluminum compound which will decompose at less than about 1000° C. leaving aluminum oxide as a residue may be used. After intimately mixing the aforesaid admixture, I heat it at about 1000° C. for 30 to 45 minutes to produce an improved chromium-activated aluminum oxide phosphor.

It will be understood that many other chromium activators and equivalent fluxes of the type mentioned and which may be used in my process will occur to those skilled in the art to which it appertains. These I aim to include within the scope of the appended claims.

What I claim as new and desire to secure by Letters Patent of the United States is:

1. The method of producing a chromium-activated aluminum oxide fluorescent material which comprises intimately admixing a quantity of an aluminum compound of the group consisting of aluminum oxide and compounds reducible to aluminum oxide when heated at temperatures below about 1000° C. with a minor proportion of chromium in the form of a suitable chromium compound and from 2 to 10 per cent of a flux consisting of the fluoride of a metal selected from the group consisting of aluminum, magnesium and calcium, and thereafter firing the resultant admixture at a temperature substantially lower than 2000° C.

2. The method of forming a chromium-activated aluminum oxide phosphor which comprises intimately admixing a quantity of an aluminum compound of the group consisting of aluminum oxide and compounds reducible to aluminum oxide when heated at temperatures below about 1000° C. with from 0.1 to 10 per cent of a suitable chromium compound and from 2 to 10 per cent of a flux consisting of the fluoride of a metal selected from the group consisting of aluminum, magnesium and calcium, and thereafter firing the resultant admixture at a temperature substantially lower than 2000° C.

3. The method of forming a chromium-activated aluminum oxide phosphor which comprises intimately admixing a quantity of an aluminum compound of the group consisting of aluminum oxide and compounds which are reducible to aluminum oxide at temperatures below about 1000° C. with from 0.1 to 10 per cent of a suitable chromium compound and from 2 to 10 per cent of a flux consisting of the fluoride of a metal selected from the group consisting of aluminum, magnesium and calcium, and thereafter firing the resultant admixture at about 1000° C.

4. The method of forming a chromium-activated aluminum oxide phosphor which comprises intimately admixing a quantity of an aluminum compound of the group consisting of aluminum oxide and compounds which are reducible to aluminum oxide at temperatures below about 1000° C. with from 0.1 to 10 per cent of a suitable chromium compound and from 2 to 10 per cent of a metallic fluoride flux, and thereafter firing the resultant admixture at about 1000° C.

5. The method of making a fluorescent chromium-activated aluminum oxide which comprises intimately admixing an aluminum compound selected from the group consisting of the oxide, nitrate and hydroxide with a minor proportion of a chromium compound selected from the group consisting of lead chromate and silver chromate and about 2 to 10 per cent of a metallic fluoride flux, and then firing the resultant admixture at a temperature of approximately 1000° C.

6. The method of making a fluorescent chromium-activated aluminum oxide which comprises intimately admixing an aluminum compound selected from the group consisting of the oxide, nitrate and hydroxide with a minor proportion of a chromium compound selected from the group consisting of lead chromate and silver chromate and about 2 to 10 per cent of the fluoride of a metal selected from the group consisting of aluminum, magnesium and calcium, and then firing the resultant admixture at a temperature of approximately 1000° C.

7. The method of making a fluorescent chromium-activated aluminum oxide which comprises intimately admixing aluminum oxide with about 0.1 to 10 per cent of chromium in the form of a metallic chromate and about 2 to 10 per cent of a metallic fluoride flux, and then firing the resultant admixture at a temperature of approximately 1000° C.

8. The method of producing a fluorescent aluminum oxide which comprises intimately admixing a quantity of an aluminum compound of the group consisting of aluminum oxide and compounds reducible to aluminum oxide when heated at temperatures below about 1000° C. with a minor proportion of an activating material and about 2 to 10 per cent of a flux consisting of a metallic fluoride, and then firing the resultant admixture at a temperature of approximately 1000° C.

9. The method of producing a fluorescent aluminum oxide which comprises intimately admixing a quantity of an aluminum compound of the group consisting of aluminum oxide and compounds reducible to aluminum oxide when heated at temperatures below about 1000° C. with a minor proportion of an activating material and about 2 to 10 per cent of a flux consisting of the fluoride of a metal selected from the group consisting of aluminum, magnesium and calcium, and then firing the resultant admixture at a temperature of approximately 1000° C.

WILLARD A. ROBERTS.